United States Patent [19]
Houlihan et al.

[11] 3,867,465
[45] Feb. 18, 1975

[54] SUBSTITUTED P-(1-HYDROXYALKYL) PHENETHYL ALCOHOLS

[75] Inventors: William J. Houlihan, Mountain Lakes; Jeffrey Nadelson, Lake Parsippany, both of N.J.

[73] Assignee: Sandoz-Wander, Inc., Hanover, N.J.

[22] Filed: June 4, 1973

[21] Appl. No.: 366,763

[52] U.S. Cl...... 260/618 R, 260/465 R, 260/515 A, 260/515 R, 260/592, 260/613 D, 260/618 D, 260/618 H, 260/665 G, 424/340, 424/343
[51] Int. Cl...................... C07c 43/20, C07c 33/02
[58] Field of Search........ 260/618 D, 618 H, 618 R, 260/613 D

[56] References Cited
UNITED STATES PATENTS

| | | | |
|---|---|---|---|
| 2,058,373 | 10/1936 | Weissenborn | 260/618 R |
| 3,267,145 | 8/1966 | Lund et al. | 260/618 R |
| 3,354,230 | 11/1967 | Feldman et al. | 260/618 R |

Primary Examiner—Joseph E. Evans
Assistant Examiner—D. B. Springer
Attorney, Agent, or Firm—Gerald D. Sharkin; Robert S. Honor

[57] ABSTRACT

Substituted phenethyl alcohols, e.g., p-(2,2-dimethyl-1-hydroxypropyl)phenethyl alcohol, are prepared by reducing a corresponding phenyl acetic acid and are useful as hypolipidemic agents.

4 Claims, No Drawings

SUBSTITUTED P-(1-HYDROXYALKYL) PHENETHYL ALCOHOLS

This invention relates to substituted phenethyl alcohols which exhibit hypolipidemic activity. In particular, it relates to substituted p-(1-hydroxyalkyl)phenethyl alcohol, and processes for their preparation.

The compounds of this invention may be represented by the formula:

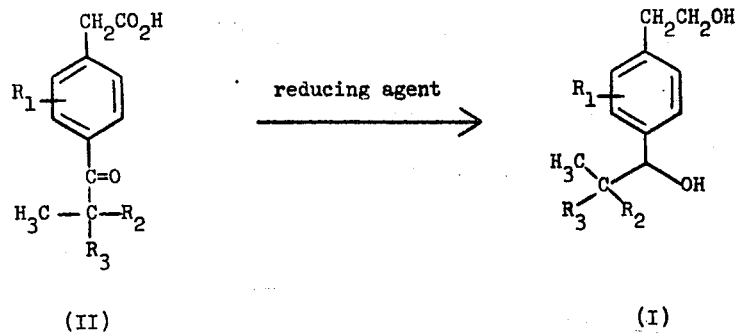

(I)

where
- $R_1$ represents hydrogen, halo having an atomic weight of about 19 to 36, and straight chain lower alkoxy, i.e., straight chain alkoxy having 1 to 4 carbon atoms, e.g., methoxy, ethoxy, or the like, and
- $R_2$ and $R_3$ each independently represent alkyl having 1 or 2 carbon atoms, i.e., methyl or ethyl.

The compounds of formula (I) are prepared according to the following reaction scheme:

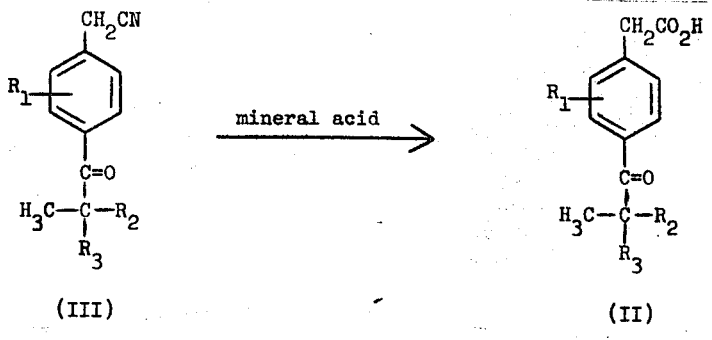

(III) → mineral acid → (II)

where $R_1$, $R_2$ and $R_3$ are as set out above.

The compounds of formula (II) are prepared by hydrolyzing compounds of formula (III) with aqueous mineral acids. When $R_1$ is hydrogen or halo, it is preferred that concentrated mineral acid be used. When $R_1$ is lower alkoxy, it is preferred that a dilute mineral acid be employed. The acid can be hydrochloric acid, sulfuric acid, phosphoric acid and the like. The particular acid used is not critical but hydrochloric acid is preferred. The aqueous solvent can be water or a mixture of water and a water soluble organic solvent, e.g., the lower alkanols. The preferred solvent is water, although the particular solvent used is not critical. The temperature of the reaction is also not critical, but it is preferred that the reaction be carried out from about 20° to 80°C., especially at the reflux temperature of the solvent. The reaction is run for about 12 to 72 hrs., preferably 40 to 50 hrs. The product is recovered by conventional techniques, e.g., recrystallization.

The compounds of formula (III) are prepared according to the following reaction scheme:

(II) → reducing agent → (I)

where $R_1$, $R_2$ and $R_3$ are as set out above.

The compounds of formula (I) are prepared by reducing a compound of the formula (II) with an alkali metal hydride reducing agent such as sodium aluminum hydride or lithium aluminum hydride, the latter being especially preferred. The reaction is carried out in the presence of an inert organic solvent such as the ethers, e.g., tetrahydrofuran or diethylether, preferably tetrahydrofuran. Although the temperature of the reaction is not critical, it is prefered that the reaction be run from about 0° to 100°C., especially at the reflux temperature of the solvent. The reaction is run from about 2.5 to 3.5 hours. The compounds of formula (I) are recovered by conventional techniques, e.g., evaporation.

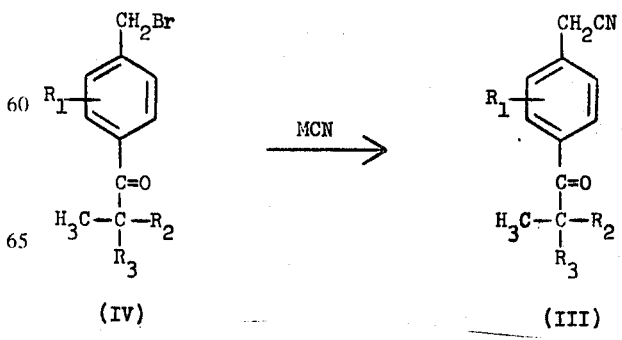

(IV) → MCN → (III)

where
M represents an alkali metal, preferably sodium or potassium and
$R_1$, $R_2$ and $R_3$ are as set out above.

The compounds of formula (III) are prepared by treating compounds of formula (IV) with an alkali metal cyanide such as sodium cyanide, potassium cyanide, and the like, preferably potassium cyanide, in the presence of an aqueous organic solvent or anhydrous dimethylsulfoxide. The preferred solvents are the aqueous-lower alkanols such as water and methanol, ethanol and the like, and water-dioxane. The temperature of the reaction is not critical but it is preferred that the process be carried out at a temperature between about 40° to 120°C., especially at the reflux temperature of the system. The reaction is run for about 1–10 hours; preferably 3 to 5 hours. The product is recovered by conventional techniques, e.g., evaporation.

The compounds of formula (IV) are prepared according to the following reaction scheme:

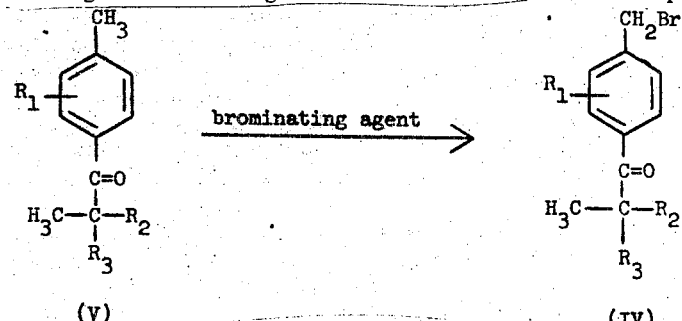
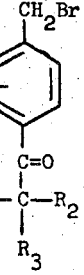

(V)                                                  (IV)

where $R_1$, $R_2$ and $R_3$ are as set out above.

The compounds of formula (IV) are prepared by treating a compound of formula (V) with a brominating agent in the presence of an inert organic solvent and free radical initiator. The brominating agent which can be used is bromine, N-bromosuccinimide, N-bromo-phthalamide, N-bromo-acetamide and the like. The particular agent used is not critical, but N-bromosuccinamide is preferred. In the preferred process, the free radical initiator used is an organic or inorganic peroxide, especially benzoyl peroxide. The reaction can also be carried out under ultraviolet light. Although the particular solvent used is not critical, the preferred solvents are the halogenated hydrocarbons such as methylene dichloride, chloroform, carbon tetrachloride and the like, although the aromatic hydrocarbons such as benzene can also be employed. The temperature of the reaction is not critical, and can range from 20° to 80°C., but reflux temperature of the solvent is preferred. The reaction is run for about 12 to 48 hours; preferably 18 to 25 hours. The product is recovered by conventional techniques, e.g., crystallization.

Many of the compounds of formula (V) are known and may be prepared by methods described in the literature. The compounds of formula (IV) not specifically disclosed may be prepared by analogous methods from known starting materials.

The compounds of formula (I) are useful because they possess pharmacological activity in animals. In particular, they are useful as hypolipidemic agents in the treatment of lipidemia in particular hyperlipoproteinemia as indicated by the fall in cholesterol and triglyceride levels in male albino Wistar rats weighing 110–130 g. initially. The rats are maintained on drug-free laboratory chow diet for seven days and then divided into groups of 8 to 10 animals. Each group with the exception of the control is then given orally 30 milligrams per kilogram of body weight per diem of the compound for 6 days. At the end of this period, the animals are anesthetized with sodium hexobarbital and bled from the carotid arteries. Serum or plasma samples are collected, and 1.0 ml. samples of the serum are added to 9.0 ml. redistilled isopropanol. Two autoanalyzer cupsful of a mixture of zeolite-copper hydroxide and Lloydds reagent (Kessler, G., and Lederer, H., 1965, Technicon Symposium, Mediad Inc., New York, [345–347]) are added, and the mixture is shaken for 1 hour. Cholesterol and triglyceride levels are determined simultaneously on the same sample by Technicon N 24 A (cholesterol) and N-78 (triglyceride) methodology. The mean total serum cholesterol levels are then computed and the hypocholesterolemic activity is expressed as the fall in cholesterol levels as a percentage of the control level. The change in serum triglyceride levels induced by the drug is computed as a percentage of the control triglyceride levels.

For such usage, the compounds (I) may be combined with a pharmaceutically acceptable carrier or adjuvant and may be administered orally or parenterally as such or admixed with conventional pharmaceutical carriers. They may be administered in such forms as tablets, dispersible powders, granules, capsules, syrups and elixirs and parenterally as solutions, suspensions, dispersions, emulsions and the like, e.g., a sterile injectable aqueous solution. The dosage will vary depending upon the mode of administration utilized and the particular compound employed.

The hypolipidemic effective dosage of compounds (I) employed in the alleviation of lipidemia may vary depending on the particular compound employed and the severity of the condition being treated. However, in general, satisfactory results are obtained when the compounds of formula (I) are administered at a daily dosage of from about 4.0 milligrams to about 250 milligrams per kilogram of animal body weight, preferably given in divided doses two to four times a day, or in sustained release form. For most large mammals, the total daily dosage is from about 300 milligrams to about 4,000 milligrams. Dosage forms suitable for internal use comprise from about 75 to about 2,000 milligrams of the active compound in intimate admixture with a solid or liquid pharmaceutically acceptable carrier or diluent.

A representative formulation suitable for oral administration 2 to 4 times a day for the treatment of lipidemia is a capsule prepared by standard encapsulating techniques which contains the following:

| Ingredients | Weight (mg) |
|---|---|
| p-(2,2-dimethyl-1-hydroxypropyl)-phenethyl alcohol | 100 |
| inert solid diluent (starch, lactose, kaolin) | 200 |

EXAMPLE 1

α-bromo-p-pivaloyl toluene.

To a suspension of 28.5 g. (1.17 g. atoms) magnesium turnings in 150 ml. tetrahydrofuran under a nitrogen atmosphere there is added 10 ml. (1.17 mole) of 4-bromotoluene in 650 ml. dry tetrahydrofuran, the reaction is started and the remainder of the bromotoluene solution is added dropwise at a rate that maintains a moderate reflux. After the addition is complete, the mixture is refluxed for an additional 1½ hours. The resulting Grignard solution is added dropwise to a cold solution of 128.0 g. pivaloyl chloride (1.06 mole) in 500 ml. dry tetrahydrofuran at a rate that maintains the temperature at 0° to −5°C. The solution is stirred for an additional 1½ hours at 0° and then at room temperature for 18 hours. The mixture is then cooled to 0° and hydrolyzed by the addition of 100 ml. 2N hydrochloric acid. The layers are separated and 200 ml. of ether is added to the organic phase which is then washed respectively with 100 ml. 2N hydrochloric acid, 100 ml. 10 percent sodium bicarbonate solution and 100 ml. saturated sodium chloride. The organic layer is dried over anhydrous sodium sulfate, filtered, and the solvent is removed in vacuo to give p-pivaloyl toluene (b.p. 80°–84° C/0.7 mm, $n^{21}$=1.5108). A mixture of 156.3 g. (0.886 mole) of the resulting p-pivaloyl toluene is then added to 157.8 g. (0.886 mole) N-bromosuccinimide, 4.0 g. (0.016 mole) benozyl peroxide and 150 ml. carbon tetrachloride and heated at reflux for 18 hours. The mixture is cooled and filtered and the resulting precipitate is washed with carbon tetrachloride. The solvents are removed in vacuo and the resulting oil is distilled in vacuo to give α-bromo-p-pivaloyl toluene (b.p. 124°–132°C/0.7 mm, $n^{22}$=1.5546-V.P.C. 96 percent monobromo 4 percent-dibromo).

Following the above procedure and using in place of 4-bromotoluene equivalent amounts of:
  a. 4-bromo-2-chlorotoluene,
  b. 4-bromo-2-methoxytoluene, or
  c. 4-bromo-2-fluorotoluene,
there is obtained
  a. α-bromo-2-chloro-4-pivaloyl toluene,
  b. α-bromo-2-methoxy-4-pivaloyl toluene, or
  c. α-bromo-2-fluoro-4-pivaloyl toluene, respectively.

EXAMPLE 2 p-pivaloyl phenyl acetonitrile.

A solution of 39.2 g. (0.700 mole) potassium cyanide in 40 ml. of water is warmed to 50°C. and a solution of α-bromo-p-pivaloyl toluene in 85 ml. ethanol is then added dropwise at such a rate as to maintain the temperature at 50°C. After the addition is complete the mixture is refluxed for 4 hours. The excess ethanol is removed in vacuo and the resulting residue is treated with ether/water. The layers are separated and the ether is washed with cold 50 percent sulfuric acid, water and sodium bicarbonate, then the ether layer is dried over anhydrous magnesium sulfate, filtered and evaporated in vacuo. The residue is distilled in vacuo to give p-pivaloyl phenyl acetonitrile (b.p. 143°–148°C/0.75 mm, $n^{22}$=1.5244).

Following the above procedure and using in place of α-bromo-p-pivaloyl toluene an equivalent amount of
  a. α-bromo-2-chloro-4-pivaloyl toluene,
  b. α-bromo-2-methoxy-4-pivaloyl toluene, or
  c. α-bromo-2-fluoro-4-pivaloyl toluene,
there is obtained
  a. 2-chloro-4-pivaloyl phenyl acetonitrile,
  b. 2-methoxy-4-pivaloyl phenyl acetonitrile, or
  c. 2-fluoro-4-pivaloyl phenyl acetonitrile, respectively.

EXAMPLE 3 p-pivaloyl phenyl acetic acid.

To a flask equipped with a stirrer, dropping funnel and condenser there is added 50.0 g. (0.25 mole) of p-pivaloyl phenyl acetonitrile to 1 liter concentrated hydrochloric acid which is then refluxed for 48 hours. The resultant precipitate is filtered, dissolved in chloroform, and washed with 2N sodium hydroxide. The basic aqueous phase is separated from the organic phase, cooled and acidified with concentrated hydrochloric acid and the resulting solid is then recrystallized from hot benzene to give p-pivaloyl phenyl acetic acid, m.p. (111°–112°C.).

Following the above procedure and using in place of p-pivaloyl phenyl acetonitrile an equivalent amount of
  a. 2-chloro-4-pivaloyl phenyl acetonitrile, or
  b. 2-fluoro-4-pivaloyl phenyl acetonitrile,
there is obtained
  a. 2-chloro-4-pivaloyl phenyl acetic acid, or
  b. 2-fluoro-4-pivaloyl phenyl acetic acid, respectively.

Again following the above procedure and using in place of p-pivaloyl phenyl acetonitrile an equivalent amount of 2-methoxy-4-pivaloyl phenyl acetonitrile and dilute hydrochloric acid in place of concentrated hydrochloric there is obtained 2-methoxy-4-pivaloyl phenyl acetic acid.

EXAMPLE 4 p-(2,2-dimethyl-1-hydroxypropyl)phenethyl alcohol.

To a solution of 5.2 g. (0.137 mole) of lithium aluminum hydride in 35 ml. of tetrahydrofuran cooled in an ice-bath, there is added dropwise 10 g. (0.045 mole) of p-pivaloyl phenyl acetic acid in 75 ml. of tetrahydrofuran over a period of about 30 minutes. After the addition is complete, the resulting mixture is refluxed for 3 hours and then cooled in an ice-bath, while quenching successively with 31.2 ml. of ethyl acetate, 10.4 ml. of sodium hydroxide and 15.6 ml. of water. The resulting mixture is then treated with anhydrous magnesium sulfate, filtered and evaporated in vacuo. The residue is triturated with petroleum ether containing a small amount of ether to give p-(2,2-dimethyl-1-hydroxypropyl)-phenethyl alcohol, m.p. 134°–137°C.

Following the above procedure and using in place of p-pivaloyl phenyl acetic acid, an equivalent amount of
  a. 2-chloro-4-pivaloyl phenyl acetic acid,
  b. 2-fluoro-4-pivaloyl phenyl acetic acid, or
  c. 2-methoxy-4-pivaloyl phenyl acetic acid
there is obtained
  a. 2-chloro-4-(2,2-dimethyl-1-hydropropyl)-phenethyl alcohol,
  b. 2-fluoro-4-(2,2-dimethyl-1-hydroxypropyl)-phenethyl alcohol,
or
  c. 2-methoxy-4-(2,2-dimethyl-1-hydroxypropyl)-phenethyl alcohol, respectively.

The p-(2,2-dimethyl-1-hydroxypropyl)-phenethyl alcohol of this example is an effective hypolipidemic agent when orally administered to an animal suffering from lipidemia at a dosage of from about 75 to 250 milligrams four times per day.

What is claimed is:

1. A compound of the formula

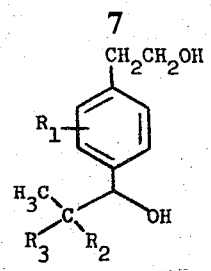

where
- $R_1$ represents hydrogen, halo having an atomic weight of about 19 to 36 or straight chain lower alkoxy, and
- $R_2$ and $R_3$ each independently, represent lower alkyl having 1 to 2 carbon atoms.

2. A compound of the formula

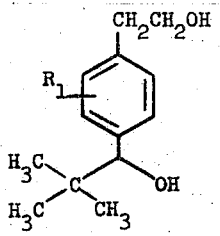

where
$R_1$ is as defined in claim 1.

3. A compound of the formula

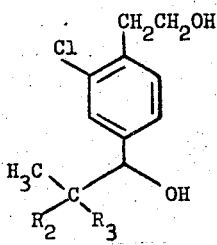

where $R_2$ and $R_3$ are as defined in claim 1.

4. The compound of claim 1 which is p-(2,2-dimethyl-1-hydroxypropyl)-phenethyl alcohol.

* * * * *